US012286823B2

(12) United States Patent
Kenyon

(10) Patent No.: US 12,286,823 B2
(45) Date of Patent: Apr. 29, 2025

(54) BYPASS DOOR ASSEMBLY

(71) Applicant: Marketing Displays, Inc., Farmington Hills, MI (US)

(72) Inventor: Gregory James Kenyon, Farmington Hills, MI (US)

(73) Assignee: Marketing Displays, Inc., Farmington Hills, MI (US)

( * ) Notice: Subject to any disclaimer, the term of this patent is extended or adjusted under 35 U.S.C. 154(b) by 563 days.

(21) Appl. No.: 17/528,890

(22) Filed: Nov. 17, 2021

(65) Prior Publication Data

US 2022/0154503 A1 May 19, 2022

Related U.S. Application Data

(60) Provisional application No. 63/115,385, filed on Nov. 18, 2020.

(51) Int. Cl.
*E05D 15/06* (2006.01)
*A47F 5/00* (2006.01)
*A47F 5/08* (2006.01)

(52) U.S. Cl.
CPC .......... *E05D 15/063* (2013.01); *A47F 5/0018* (2013.01); *E05D 15/0652* (2013.01); *E05D 15/0656* (2013.01); *A47F 5/0807* (2013.01); *E05Y 2201/64* (2013.01); *E05Y 2201/684* (2013.01); *E05Y 2900/202* (2013.01)

(58) Field of Classification Search
CPC .............. E05D 15/063; E05D 15/0652; E05D 15/0656; A47F 5/0018
See application file for complete search history.

(56) References Cited

U.S. PATENT DOCUMENTS 643,307 A * 2/1900 Schmitt .................. E05D 15/06 312/304
3,360,136 A * 12/1967 Ain ...................... A47F 7/0042 49/410
3,480,989 A * 12/1969 Edeus .................. E06B 3/4654 16/94 R (Continued)

FOREIGN PATENT DOCUMENTS

AT 397276 B * 1/1994 ............ E05D 15/06
CN 201661170 U 12/2010

(Continued)

OTHER PUBLICATIONS

International Search Report and Written Opinion for Application No. PCT/US2021/059891dated Mar. 11, 2022.

(Continued)

*Primary Examiner* — Stanton L Krycinski

(74) *Attorney, Agent, or Firm* — Harness, Dickey & Pierce, P.L.C.

(57) ABSTRACT

A bypass door assembly for a retail display fixture has two or more door panels each with a wheel assembly coupled to a top of the door panel and an adjustable drop rail that extends from a bottom of the door panel, a first coupling member having a first track and a second track for receiving the respective wheel assemblies of a first door panel and a second door panel, and a second coupling member having one or more guides for receiving the adjustable drop rail of one of the two or more door panels.

20 Claims, 10 Drawing Sheets

(56) References Cited

U.S. PATENT DOCUMENTS

| | | | | | |
|---|---|---|---|---|---|
| 3,643,529 | A * | 2/1972 | Bright | E06B 3/4663 | 16/96 R |
| 4,023,236 | A * | 5/1977 | Azuma | E05D 15/063 | 16/102 |
| 4,080,686 | A * | 3/1978 | Hagen | E05D 15/0643 | 16/88 |
| 4,148,535 | A | 4/1979 | Fenwick | | |
| 4,325,204 | A * | 4/1982 | Martine | E06B 3/4654 | 49/504 |
| 4,657,317 | A * | 4/1987 | Gemma | A47B 53/00 | 312/286 |
| 4,742,645 | A * | 5/1988 | Johnston | E06B 3/4654 | 49/504 |
| 4,982,852 | A * | 1/1991 | Johansen | G09F 5/00 | 211/175 |
| 5,450,693 | A | 9/1995 | Tarrega | | |
| 6,082,050 | A | 7/2000 | Schilling | | |
| 6,269,944 | B1 * | 8/2001 | Taylor | B66C 6/00 | 212/177 |
| 6,336,247 | B1 * | 1/2002 | Schnoor | E05D 15/0652 | 160/214 |
| 6,912,812 | B2 * | 7/2005 | Inage | E05D 15/0652 | 49/366 |
| 7,100,780 | B1 * | 9/2006 | VanCalbergh | A47F 3/004 | 211/94.01 |
| 7,699,089 | B2 * | 4/2010 | Knutson | E05F 15/605 | 160/199 |
| 7,770,259 | B2 * | 8/2010 | Janson | E05D 15/0652 | 16/87 R |
| 8,375,638 | B2 * | 2/2013 | Martin | E05D 13/04 | 49/411 |
| 8,646,627 | B2 * | 2/2014 | Bass | E06B 3/46 | 211/94.01 |
| 8,733,023 | B2 * | 5/2014 | Rahardjo | B66B 13/08 | 49/411 |
| 8,850,659 | B2 * | 10/2014 | Ewing | E05D 15/0634 | 16/105 |
| 9,234,376 | B2 * | 1/2016 | Trulaske, Sr. | E05D 15/0652 | |
| 10,125,528 | B2 * | 11/2018 | Wypych | E05D 15/0652 | |
| 10,508,441 | B2 * | 12/2019 | Kopish | E04F 21/1877 | |
| 10,626,648 | B2 * | 4/2020 | Sakabe | E06B 3/4645 | |
| 10,786,120 | B2 * | 9/2020 | Thews | E05D 15/0656 | |
| 11,118,385 | B2 * | 9/2021 | Hawkinson | E05F 5/003 | |
| 11,492,815 | B2 * | 11/2022 | Urpolahti | E05D 15/0652 | |
| 2006/0213850 | A1 * | 9/2006 | VanCalbergh | A47F 3/004 | 211/94.01 |
| 2006/0236613 | A1 * | 10/2006 | Ewing | E05D 15/0656 | 49/410 |
| 2008/0006594 | A1 * | 1/2008 | Layton | E06B 3/4654 | 211/162 |
| 2008/0190876 | A1 * | 8/2008 | Janson | E05D 15/0652 | 188/267 |
| 2010/0031579 | A1 * | 2/2010 | Choi | B61B 1/02 | 49/503 |
| 2011/0168497 | A1 * | 7/2011 | Mun | B66B 13/301 | 16/93 R |
| 2013/0210335 | A1 | 8/2013 | Krietzman et al. | | |
| 2015/0252603 | A1 * | 9/2015 | Cianetti | E06B 5/00 | 49/119 |
| 2016/0123078 | A1 * | 5/2016 | Bouthillier | E06B 11/026 | 248/188.4 |
| 2021/0010324 | A1 * | 1/2021 | Hawkinson | E06B 7/23 | |
| 2022/0396987 | A1 * | 12/2022 | Wei | E05F 5/003 | |

FOREIGN PATENT DOCUMENTS

| | | | | |
|---|---|---|---|---|
| DE | 2553175 | A1 | 6/1977 | |
| DE | 19753219 | A1 * | 9/1998 | E05B 65/0876 |
| EP | 1619339 | A1 * | 1/2006 | E05D 15/06 |
| FR | 2901829 | A1 * | 12/2007 | E05D 15/0652 |
| FR | 2906292 | A1 * | 3/2008 | E05D 15/063 |
| KR | 20100050000 | A * | 5/2010 | |
| WO | WO-2010147845 | A2 * | 12/2010 | E04B 2/827 |
| WO | 20170137981 | A1 | 8/2017 | |

OTHER PUBLICATIONS

Supplementary European Search Report issued in corresponding app. No. EP21895586 on Mar. 27, 2024.

* cited by examiner

BYPASS DOOR ASSEMBLY

CROSS-REFERENCE TO RELATED APPLICATIONS

This application is a utility application that claims the benefit of U.S. Provisional Application 63/115,385, filed on Nov. 18, 2020. The entire disclosure of the above application is incorporated herein by reference.

FIELD

The present disclosure relates to a bypass door assembly for a retail display fixture.

BACKGROUND

Retail display fixtures are used to display products or product information in a prominent way so that the products stand out to customers. Some retail display fixtures display products in the way in which the products are typically used. Types of retail display fixtures include racks, stands, shelving, display cases, mannequins, stall walls, and sign holders. Retail display fixtures may directly impact profit and efficiency for stores and service businesses.

Some retail display fixtures include shelves and sliding doors coupled to the shelves. The sliding doors conceal products on the shelves when the sliding doors are closed, and the products on the shelves are on display when the sliding doors are open. In some cases, the sliding doors become misaligned with tracks along which the sliding doors translate. In addition, some retail display fixtures with sliding doors are difficult to assemble.

SUMMARY

One example of a bypass door assembly according to the present disclosure includes two or more door panels, a first coupling member, and a second coupling member. Each door panel includes a wheel component that extends from a top surface of the door panel and an adjustable drop rail that extends from a bottom surface of the door panel. Each wheel component includes a wheel and a support member that couples the wheel to the respective door panel. The first coupling member has a first track and a second track. The first track is configured to receive the wheel of the wheel component of a first door panel of the two or more door panels. The second track is configured to receive the wheel of the wheel component of a second door panel of the two or more door panels. The second coupling member includes one or more guides. Each guide is configured to receive the adjustable drop rail of one of the two or more door panels.

Another example of a bypass door assembly according to the present disclosure includes a door panel, a first track, a second track, and a splice bar. The door panel includes a wheel component that extends from the door panel. The wheel component includes a wheel and a support member that couples the wheel to the door panel. Each of the first and second tracks is configured to receive the wheel of the wheel component of the door panel. The splice bar extends along at least a portion of each of the first and second tracks and thereby aligns the first and second tracks with one another.

Further areas of applicability of the present disclosure will become apparent from the detailed description, the claims and the drawings. The detailed description and specific examples are intended for purposes of illustration only and are not intended to limit the scope of the disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
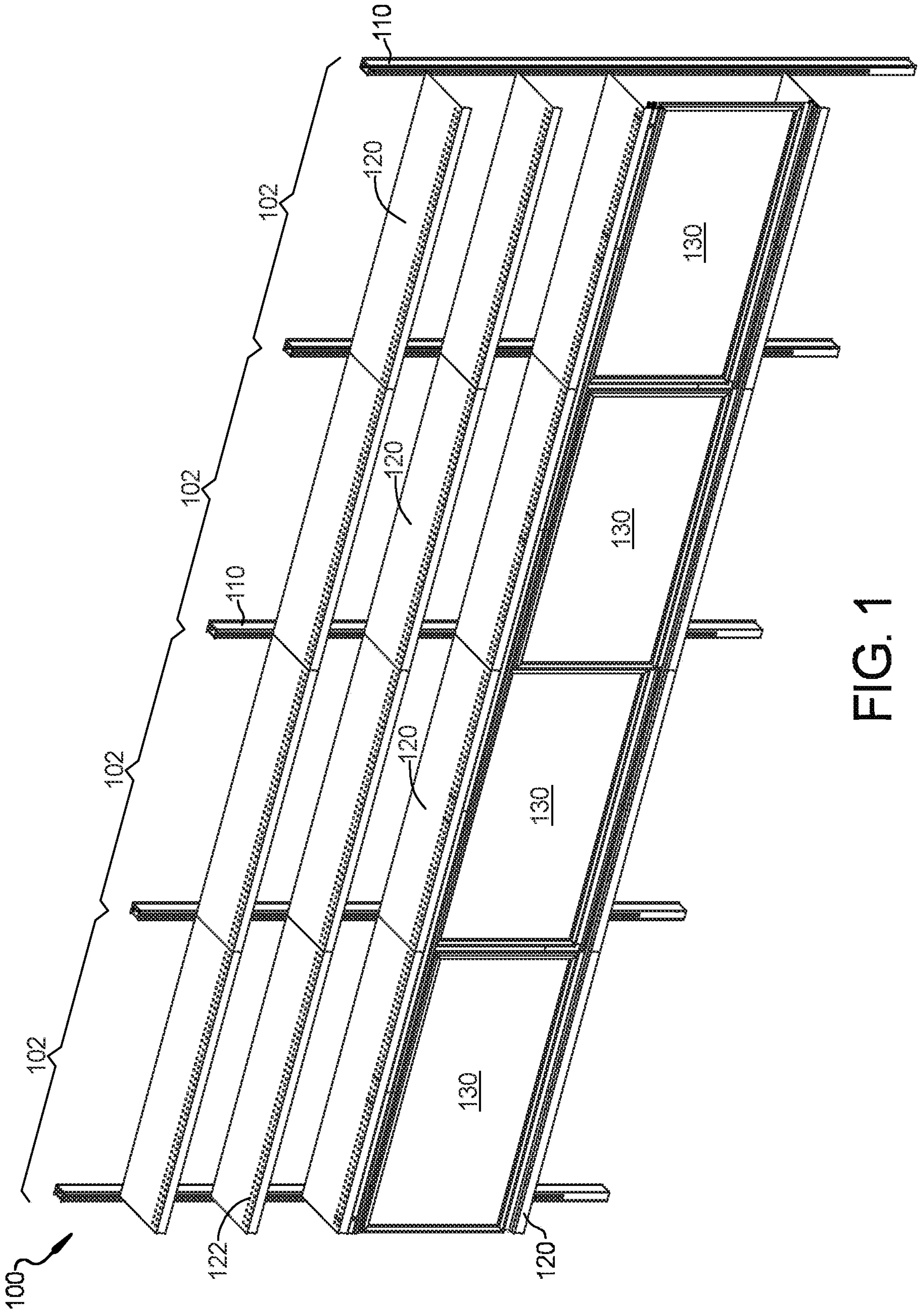
FIG. 1 is a perspective view of an example retail display fixture having bypass doors that are in a closed position.

Example embodiments will now be described more fully with reference to the accompanying drawings.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a”, “an”, and “the” may be intended to include the plural forms as well, unless the context clearly indicates otherwise. The terms “comprises”, “comprising”, “including”, and “having”, are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to", or "coupled to" another element or layer, it may be directly on, engaged, connected, or coupled to the other element or layer, or intervening elements or layers may be present. In contrast, when an element is referred to as being "directly on", "directly engaged to", "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.). As used herein, the term "and/or" includes any and all combinations of one or more of the associated listed items.

Although the terms first, second, third, etc. may be used herein to describe various elements, components, regions, layers, and/or sections, these elements, components, regions, layers and/or sections should not be limited by these terms. These terms may be only used to distinguish one element, component, region, layer, or section from another element, component, region, layer, or section. Terms such as "first", "second", and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner", "outer", "beneath", "below", "lower", above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 is a perspective view of an example retail display fixture 100. The display fixture 100 may include a plurality of units 102. Each unit may include at least two support members or beams 110 and a plurality of shelf members 120 that extend from and are supported by the support members 110. For example, as illustrated, the shelf members 120 may be coupled to and extend perpendicularly from the support members 110. Each shelf member of the plurality 120 is coupled to at least two support members 110. Each support member 110 may be coupled to one or more shelf members 120. For example, the support members 110 may support one or more vertically aligned shelves 120. Further, as illustrated, each of the support members 110 may also be coupled to a plurality of shelf members 120 of adjacent or serial units 102. The skilled artisan will recognize that the display fixture 100 may include a plurality of units 102 arranged adjacent or serially. For example, as illustrated, the display fixture 100 may include four units arranged serially. In certain instances, each unit may have width of about four feet and the assembled display fixture 100 may have a total width of about sixteen feet. Further, though not illustrated, the skilled artisan will also recognize that for each unit 102, the plurality of shelf members 120 may be arranged at different intervals or heights.

Figure 2:
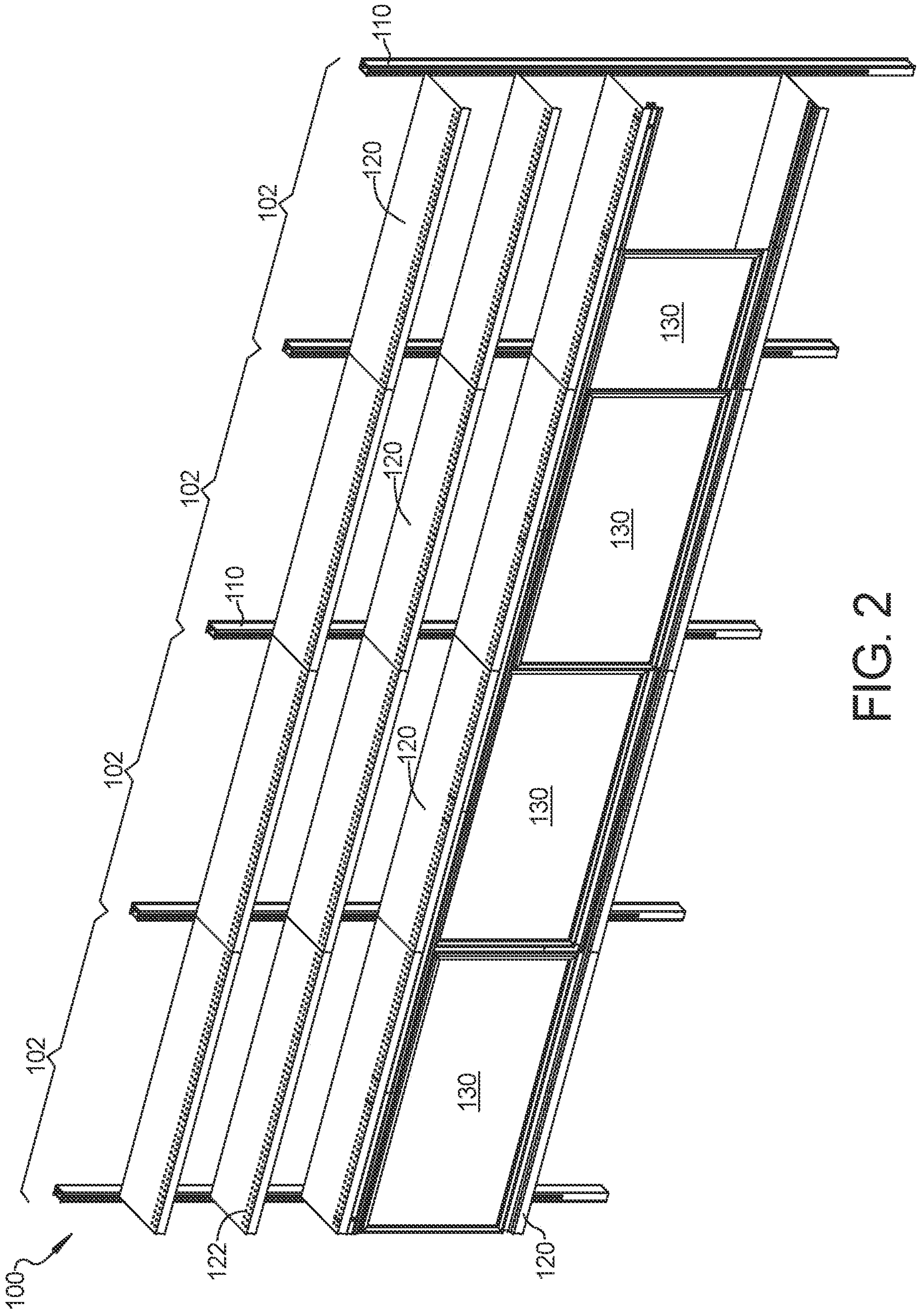
FIG. 2 is a perspective view of the example retail display fixture as illustrated in FIG. 1 where the bypass doors are in an open or overlapping position.

In various aspects, each unit 102 may include a bypass panel or door 130 that extends between two of the vertically aligned shelves 120. The door 130 may include one or more frame assemblies for holding graphical medium. For example, as illustrated, in each instance, the bypass door 130 may be coupled to and extend between two bottom shelves 120 such that the bypass door 130 of each unit 102 may slide between the adjacent units 102. For example, FIG. 2 is another illustration of the display fixture 100 where one or more of the bypass doors 130 of the serial units 102 are in an open position. Each door 130 may have a height of about 25.25 inches and a width of about 46.25 inches, by way of non-limiting example. The two bottom shelves 120 to which the doors 130 are coupled may have a spacing of about 31 inches.

Figure 3:
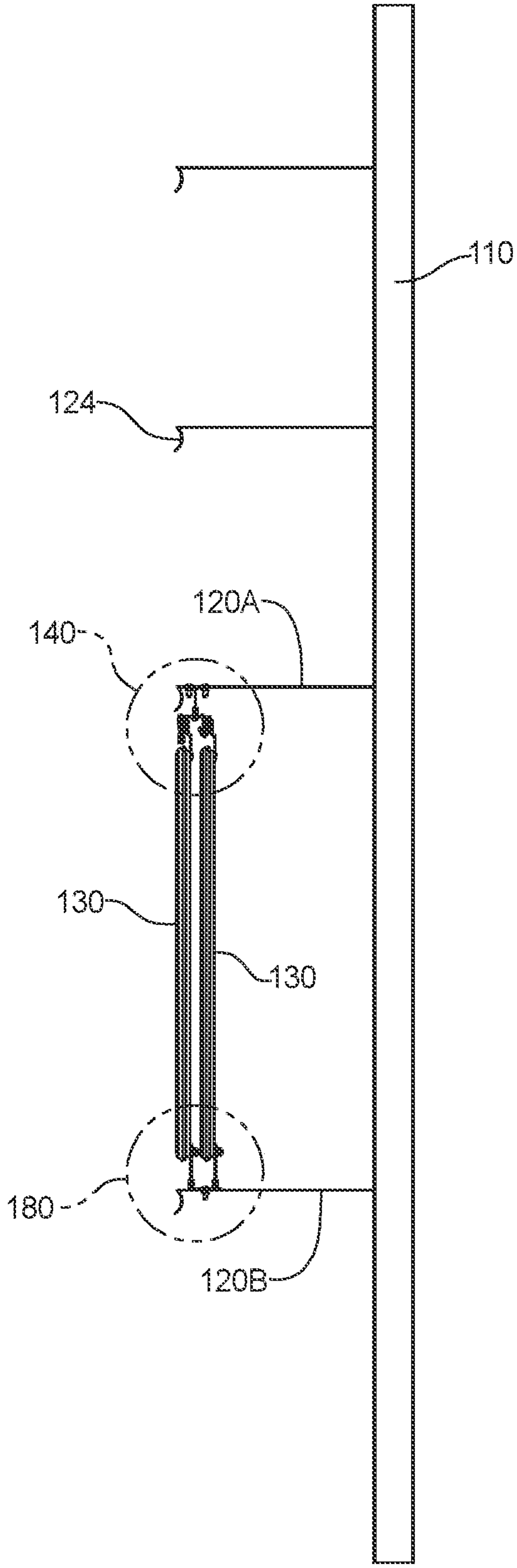
FIG. 3 is a sideview of the example retail display fixture as illustrated in FIG. 2 where the bypass doors are in an open or overlapping position.

FIG. 3 is a sideview of the example retail display fixture illustrated in FIG. 2, where one or more of the bypass doors 130 of the serial units 102 are in an open or overlapping position. As illustrated, the each door or panel 130 may have a first or upper coupling 140 and a second or bottom coupling 180. The upper coupling 140 may couple the door 130 to a top or upper shelf 120A. The bottom coupling 180 may couple the door 130 to a bottom shelf 120B. Each shelf 120, 120A, 120B may include a plurality of openings 122, such as pre-drilled holes, that may be used to couple the door 130 at different positions to shelf 120, 120A, 120B. Also, as illustrated, each shelf 120, 120A, 120B may include a lip 124 that may protect the couplings 140, 180. The lip 124 may also be configured to receive one or more labels or tags (not shown).

Figure 4A:
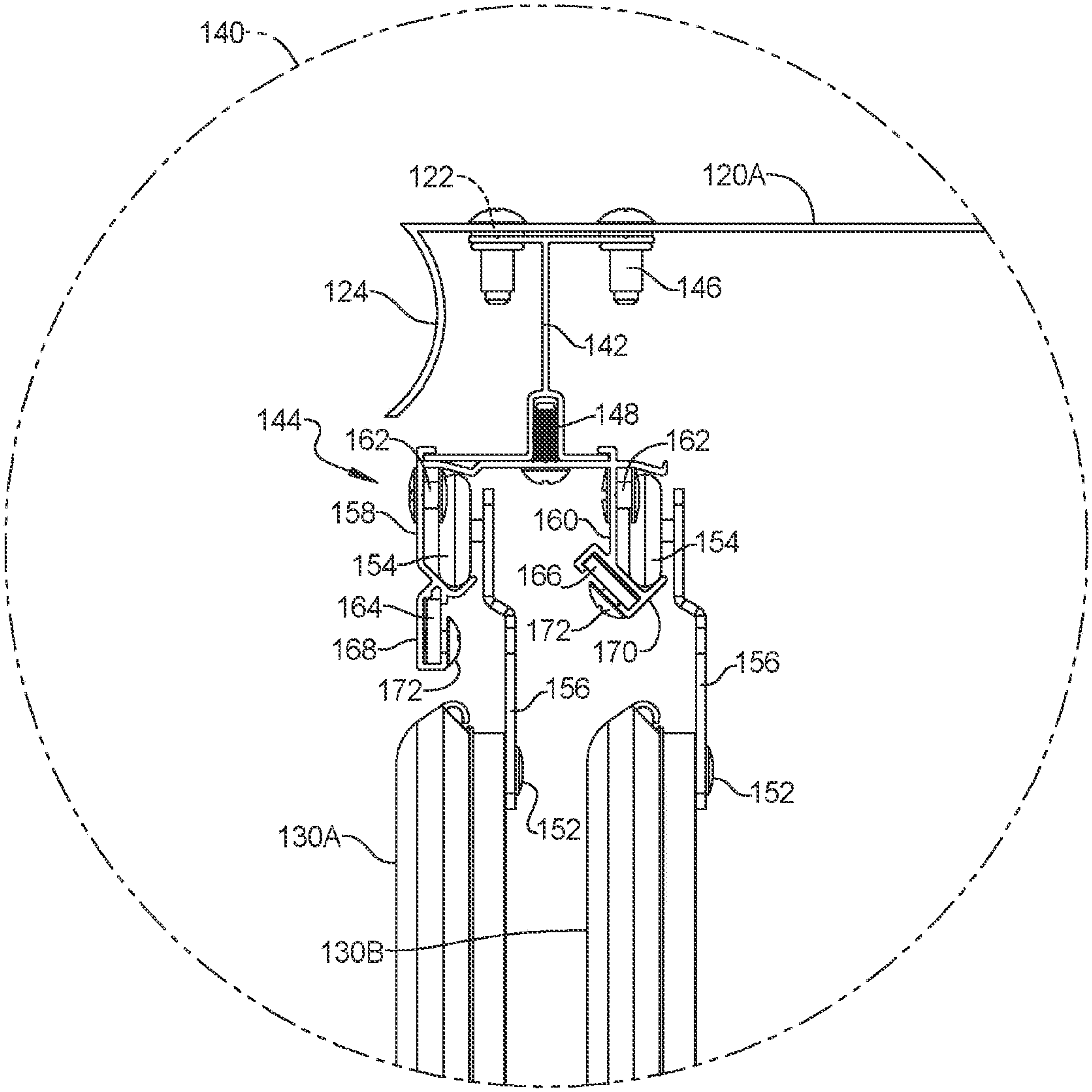
FIG. 4A is a close-up view of an upper coupling system of the bypass door assembly as illustrated in FIG. 3.
Figure 4B:
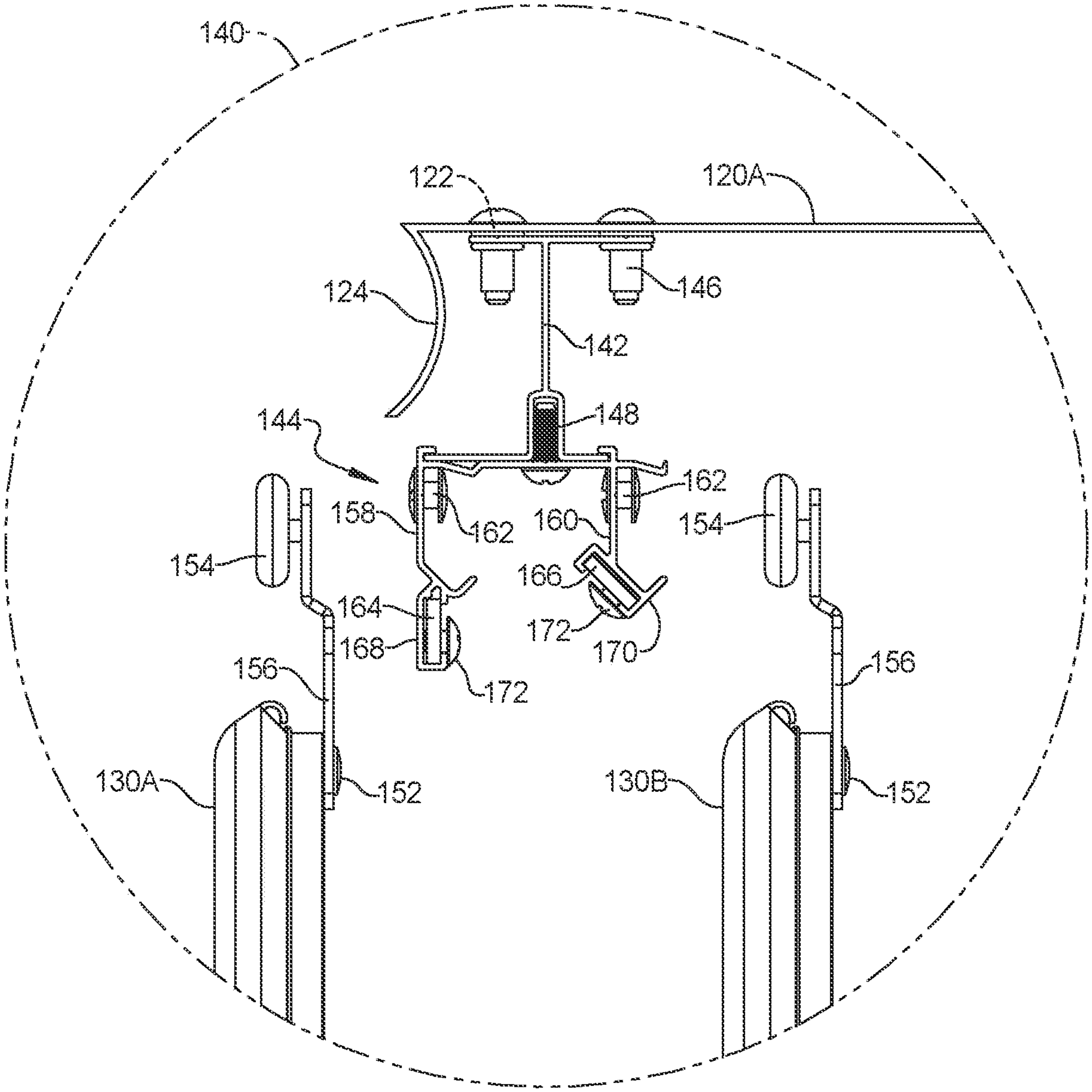
FIG. 4B is another close-up view of the upper coupling system of the bypass door assembly as illustrated in FIG. 3.

FIGS. 4A and 4B are close-up views of the upper coupling 140 as illustrated in FIG. 3. The upper coupling 140 includes a beam hanger structure 142 that extends between and couples the top shelf 120A and a track assembly 144. For example, as illustrated, the beam hanger structure 142 may be an H-shaped structure. In certain instances, one of more of these beam hanger structures 142 may be disposed along the length of the shelf 120A. For example only, H-shaped structures 142 may be positioned towards each end of the shelf 120A and one or more H-shaped structures 142 may be positioned therebetween. The upper coupling 140 may include at least one beam hanger structure 142, and in certain aspects, optionally two or more beam hanger structures 142. In this fashion, the plurality of beam hanger structures 142 work together to secure the track assembly 144, which extends continuously along the length of the shelf 120A, to the shelf 120A. In other embodiments, the beam hanger structure 142 may be a continuous member that extends along the length of the shelf 120A.

As illustrated, in each instance, the H-shaped structure 142 may be coupled to the top shelf 120A using one or more fasteners 146, such as bolts. The one or more fasteners 146 may be received by one or more of the openings 122 prefabricated along the length of the top shelf 120A. In this fashion, the H-shaped structures 142 may be secured at different positions along the shelf 120A, along both the x-axis and the z-axis. The H-shaped structure may be coupled to the track assembly 144 by one or more similar fasteners 148. The H-shaped structure may be moved relative to the track assembly 114.

The track assembly 144 is configured to receive a wheel component. The wheel component may be coupled to the respective door 130A, 130B using one or more fasteners 152, such as a bolt. Each door 130A, 1306 is coupled to at least two wheel components. The wheel component includes a wheel 154 and a support 156. The track assembly 144 includes a front or first track 158 and a back or second track 160 that is aligned with the first track 158. The first and second tracks 158, 160 extend the entire length of the shelf 120A. As illustrated, the first track 158 may be configured to receive the wheel 154 of a first door 130A, and the second track 160 may be configured to receive the wheel 154 of the second door 1306. In this fashion, the doors 130A, 1306 may slide relative to one another and back and forth while minimizing or eliminating track alignment issues or concerns.

Figure 7:
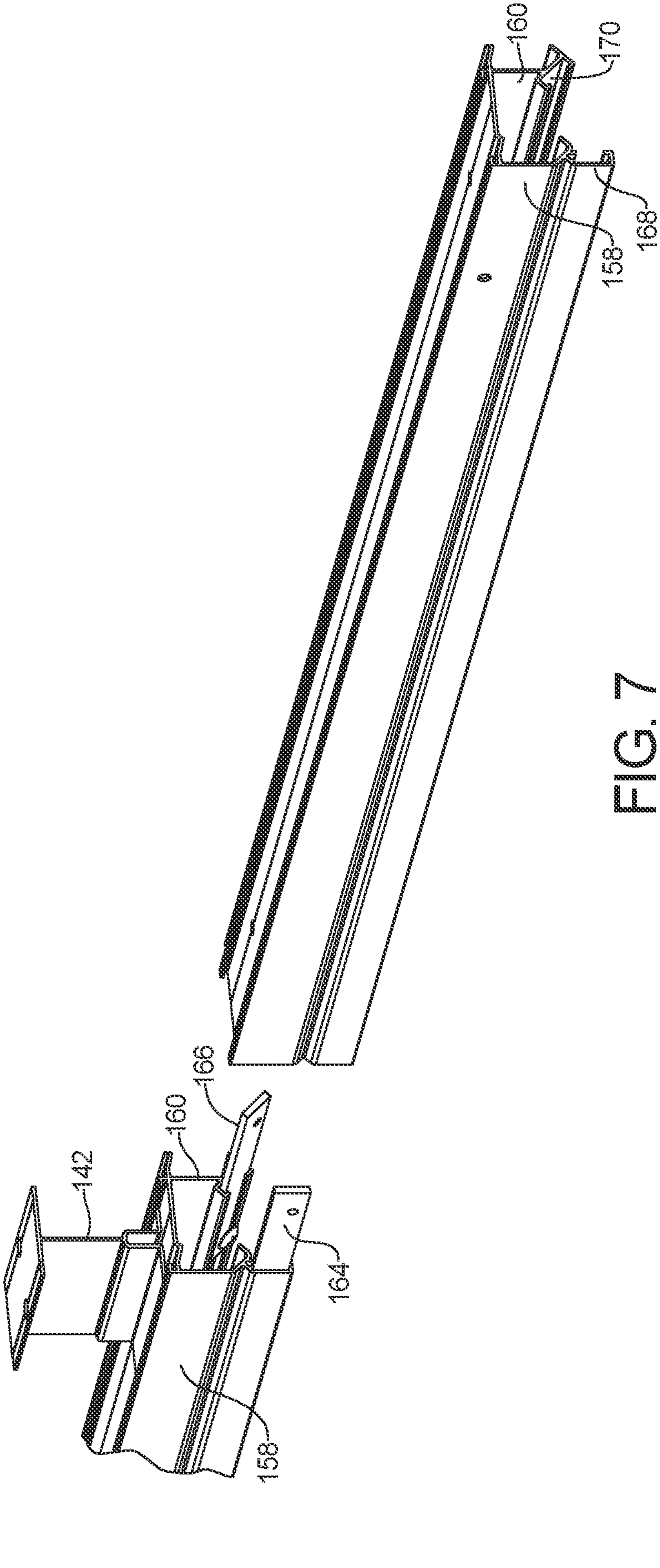
FIG. 7 is a partial view of adjacent upper coupling systems of the retail display fixture as illustrated in FIG. 1.
Figure 8:
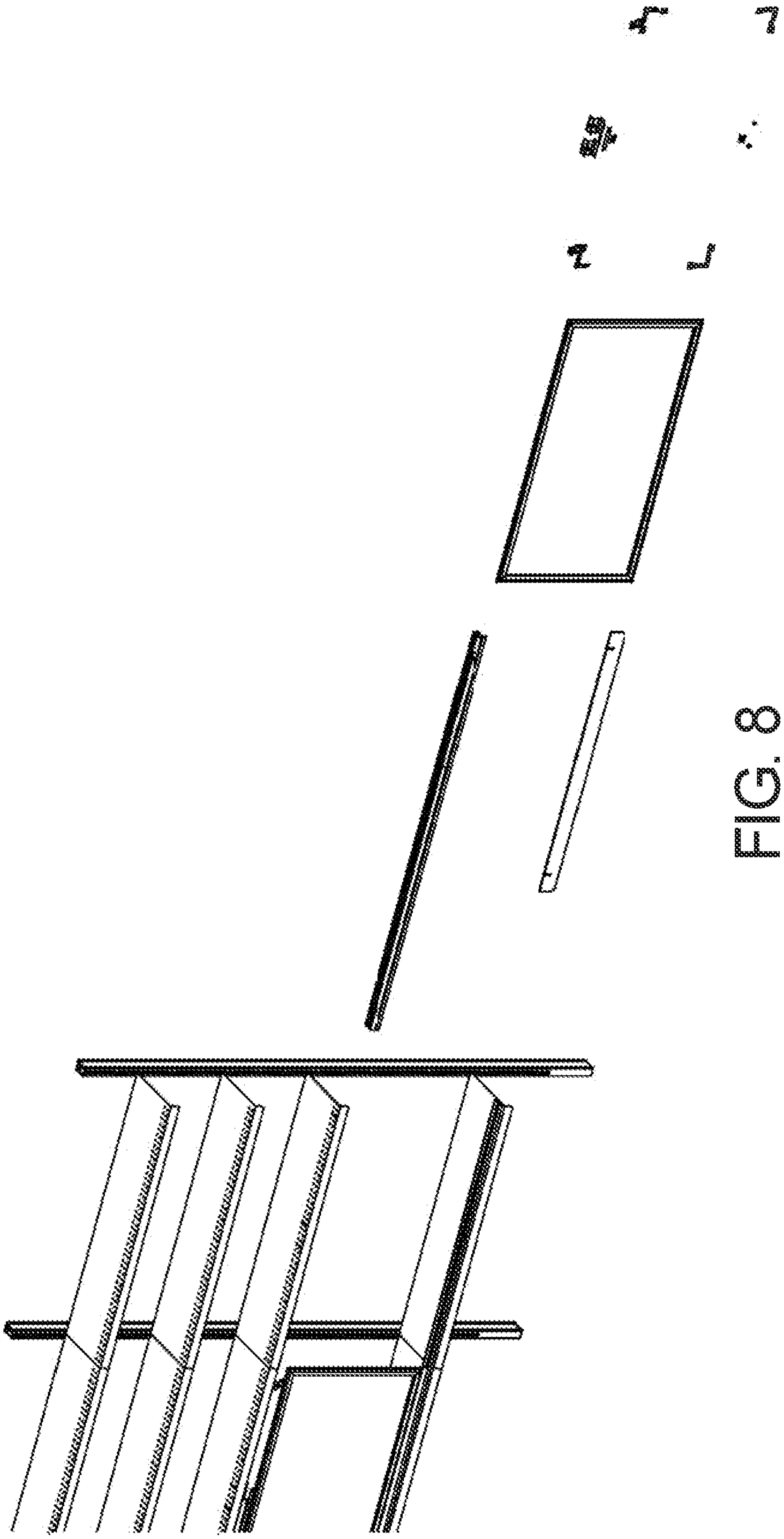
FIG. 8 is a partial parts view of the retail display fixture as illustrated in FIG. 1.

Each track 158, 160 may include, as illustrated, an end stop 162 that helps retain the wheel 154 within the respective track 158, 160. Each track 158, 160 may also include a splice bar 164, 166 that extends along at least a portion of each track 158, 160. For example, the first track 158 may include a first splice bar 164, and the second track 160 may include a second splice bar 166. In each instance, the splice bar 164, 166 may be disposed within a prefabricated channel 168, 170 that extends from the respective track 158, 160. The splice bars 164, 166 may be coupled to the respective channel 168, 170 using one or more fasteners 172, such as bolts. In each instance, the splice bars 164, 166 may assist in the alignment of tracks 158, 160 of adjacent units, and thereby the alignment of the respective doors 130A, 130B such that the doors 130A, 130B can slide respective to one another. For example, as illustrated in FIG. 7, the first splice bar 164 may extend between first tracks 158 of adjacent units 102, and the second splice bar 166 may extend between second tracks 160 of adjacent units 102.

Figure 5A:
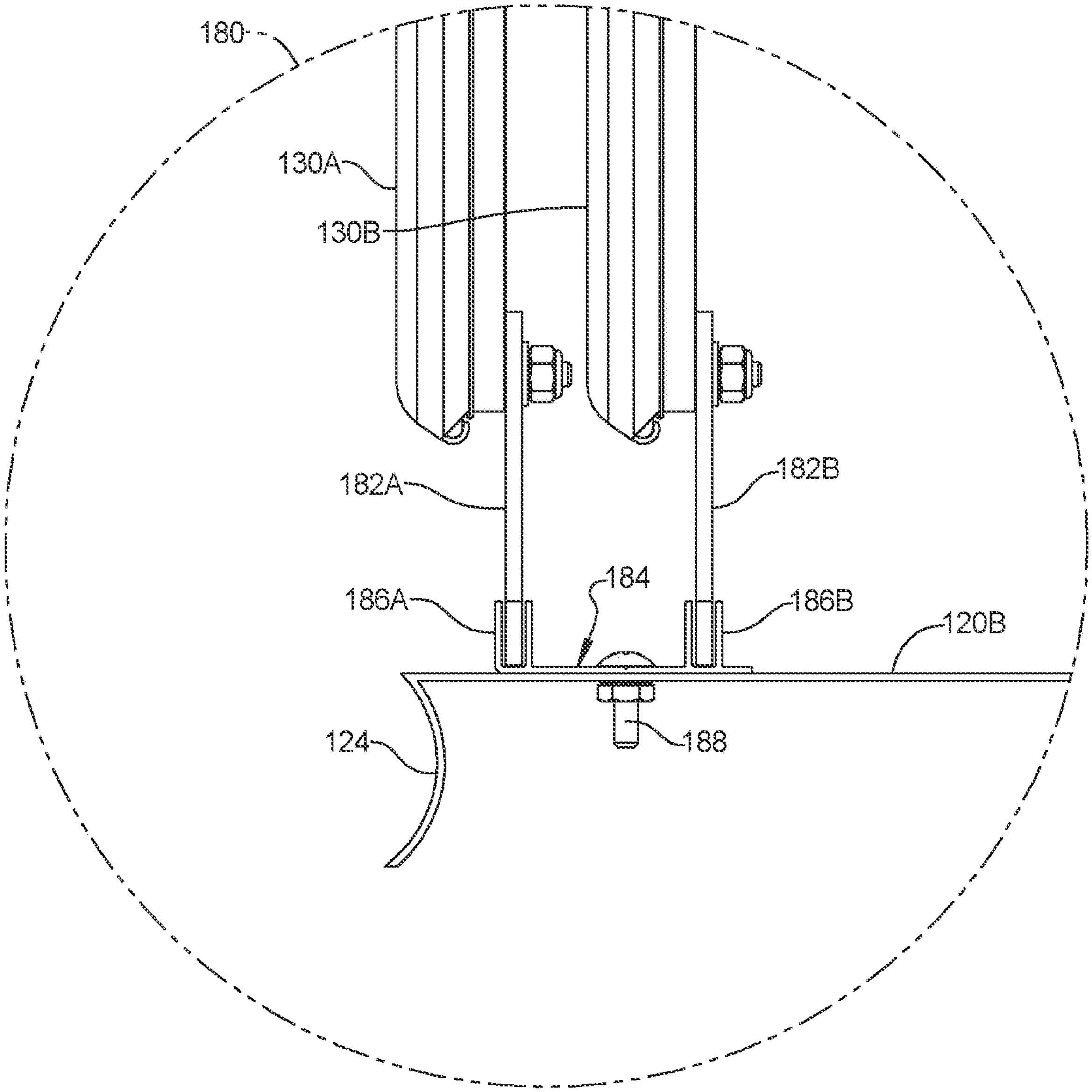
FIG. 5A is a close-up view of a bottom coupling system of the bypass door assembly as illustrated in FIG. 3.
Figure 5B:
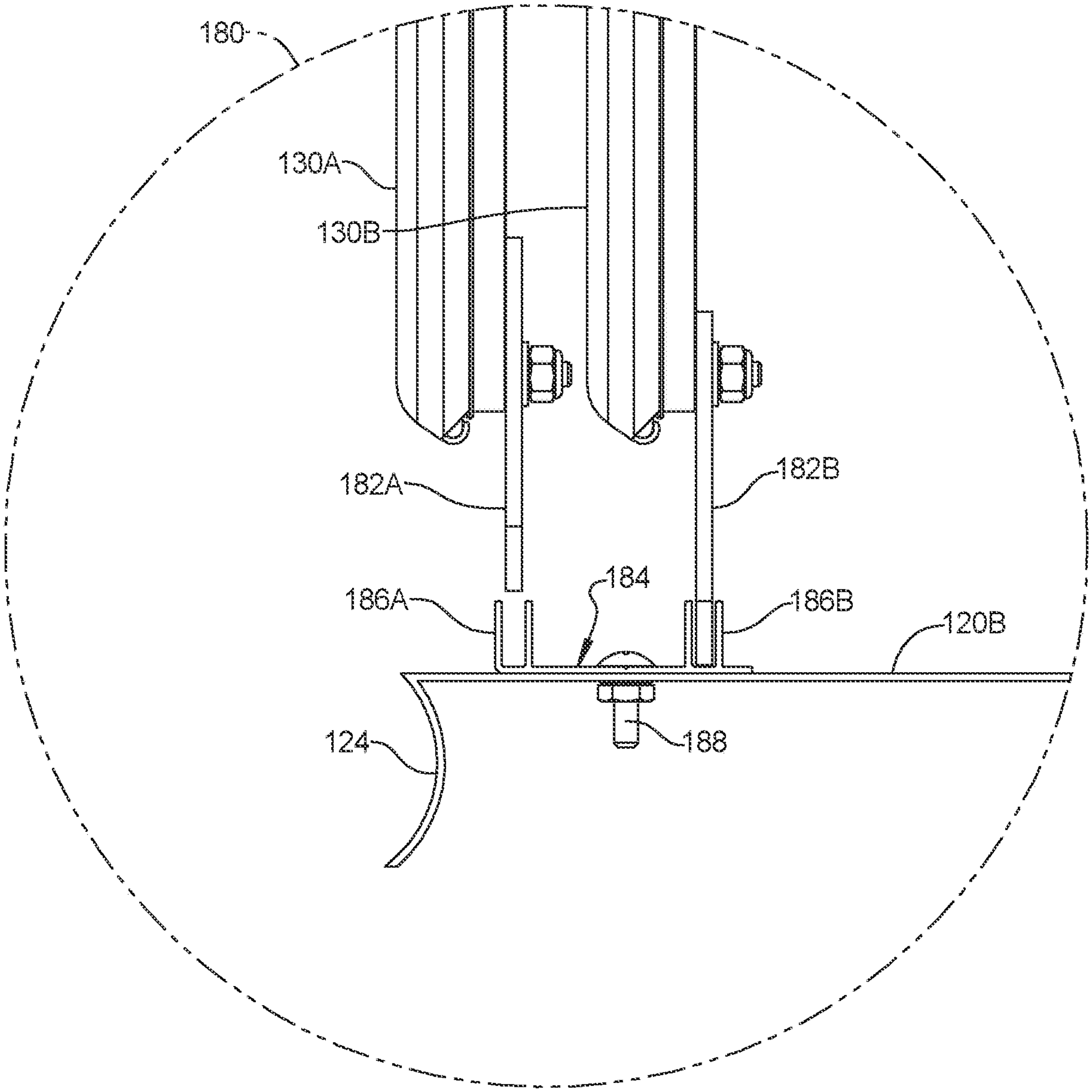
FIG. 5B is another close-up view of the bottom coupling system of the bypass door assembly as illustrated in FIG. 3.
Figure 6:
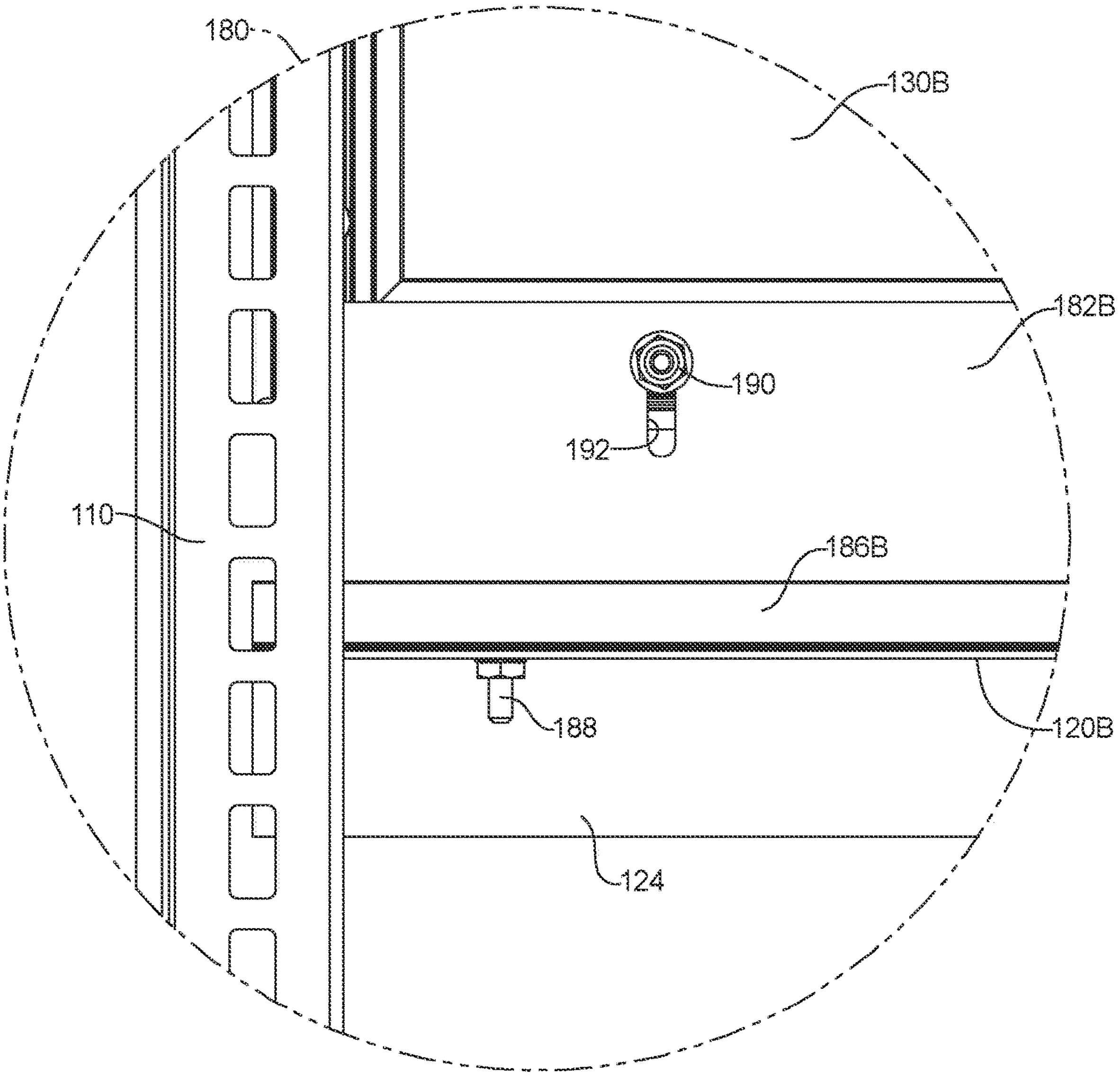
FIG. 6 is a rear view of the bottom coupling system of the bypass door assembly.

FIGS. 5A and 5B are close-up views of the bottom coupling 180 as illustrated in FIG. 3. The bottom coupling 180 includes one or more rails 182A, 182B that are coupled to the respective doors 130A, 130B and received by a receiving member 184. The one or more rails 182A, 182B, as illustrated in FIG. 6, may extend along the length of the respective panel 130A, 130B. As illustrated in FIGS. 5A and 5B, the bottom coupling 180 may have one or more U-shaped guides or receptacles 186A, 186B that are configured to receive and support the one or more rails 182A, 182B. The one or more U-shaped guides 186A, 186B may help maintain proper door alignment, especially when heavy loads are placed on the top shelf 120A.

Similar to the beam hanger structures 142 discussed above, one or more of the receiving member 184 may be disposed along the length of the shelf 120B. For example, receiving members 184 having one or more U-shaped guides or receptacles 186A, 186B may be positioned towards each end of the shelf 120B and one or more receiving members 184 (each having one or more U-shaped guides or receptacles 186A, 186B) may be positioned therebetween. The one or more receiving members 184 may be aligned with the one or more beam hanger structures 142. The bottom coupling 180 may include at least one receiving member 184, and in certain aspects, optionally two or more receiving members 184. In other embodiments, the receiving member 184 and one or more U-shaped guides or receptacles 186A, 186B may be a continuous member that extends along the length of the shelf 120B.

The receiving member 184 may be coupled to the bottom shelf 120B using one or more fasteners 188, such as bolts. The one or more fasteners 188 may be received by one or more of the openings 122 prefabricated within the bottom shelf 120B. In this fashion, the receiving member 184 may be secured at different positions along the shelf 120B, along both the x-axis and the z-axis.

The one or more rails 182A, 182B may be adjustable guide rails, for example, gravity rails, that can be moved from a first or open position to a second or final position. For example, in FIG. 5B the first rail 182A is illustrated in the first position, and the second rail 182B is illustrated in the second position. One or more fasteners 190 may secures the one or more rails 182A, 182B to each door 130A, 130B. As illustrated in FIG. 6, the one or more rails 182A, 182B may include a vertical slot 192 that receives that respective fastener 190. The position of the one or more rails 182A, 182B may be varied by changing the position of the fastener 190 within the vertical slot 192. As such, the one or more rails 182A, 182B may be adjustable so as to allow for easy placement of the doors 130A, 1308 between the shelves 120A, 120B, while also allowing the one or more rails 182A, 182B to maintain a physical downward bias during use so as to maintain door alignment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bypass door assembly comprising:
two or more door panels, wherein each door panel includes a wheel component that extends from a top surface of the door panel and an adjustable drop rail that extends from a bottom surface of the door panel, wherein each wheel component includes a wheel and a support member that couples the wheel to the respective door panel;
a first coupling member including a track assembly having a first track and a second track, wherein the first track is configured to receive the wheel of the wheel component of a first door panel of the two or more door panels and the second track is configured to receive the wheel of the wheel component of a second door panel of the two or more door panels; and
a second coupling member including one or more guides, wherein each guide is configured to receive the adjustable drop rail of one of the two or more door panels.

2. The bypass door assembly of claim 1, wherein the first and second tracks each include a splice member.

3. The bypass door assembly of claim 1, wherein each support member is coupled to the respective door panel using one or more fasteners.

4. The bypass door assembly of claim 3, wherein the one or more fasteners are bolts.

5. The bypass door assembly of claim 1, wherein the first and second tracks each include an end stop.

6. The bypass door assembly of claim 5, wherein the end stops are bolts.

7. The bypass door assembly of claim 1, wherein the adjustable drop rails are urged into the guides by the force of gravity rails.

8. A retail display fixture comprising:
three or more beam members;
a plurality of shelves coupling to and extending from the beam members; and the bypass door assembly according to claim 1 extending between a first shelf and a second shelf of the plurality of shelves.

9. The retail display fixture of claim 8, wherein the first coupling member is coupled to the first shelf of the plurality of shelves.

10. The retail display fixture of claim 9, wherein the first coupling member includes an H-shaped structure that couples the track assembly to the first shelf of the plurality of shelves.

11. The retail display fixture of claim 10, wherein one or more fasteners couple the H-shaped structure to the first shelf of the plurality of shelves.

12. The retail display fixture of claim 11, wherein the first shelf includes a plurality of prefabricated holes, and wherein the one or more fasteners are received by the plurality of prefabricated holes.

13. The retail display fixture of claim 8, wherein the second coupling member is coupled to the second shelf of the plurality of shelves.

14. The retail display fixture of claim 13, wherein one or more fasteners couple the second coupling member to the second shelf of the plurality of shelves.

15. The retail display fixture of claim 14, wherein the second shelf includes a plurality of prefabricated holes, and wherein the one or more fasteners are received by the plurality of prefabricated holes.

16. The retail display fixture of claim 8, wherein the first track is located in front of the second track relative to a depth of at least one of the first and second shelves.

17. The bypass door assembly of claim 1, wherein each guide is U-shaped.

18. The bypass door assembly of claim 1, wherein each adjustable drop rail defines a vertical slot for receiving a fastener to secure the respective drop rail to one of the door panels.

19. A retail display fixture comprising:

first and second ones of the bypass door assembly according to claim 1 disposed adjacent to one another;

a first splice bar extending between the first track of the first bypass door assembly and the first track of the second bypass door assembly; and a second splice bar extending between the second track of the first bypass door assembly and the second track of the second bypass door assembly.

20. The bypass door assembly of claim 1, wherein the adjustable drop rail is adjustable in a vertical direction relative to the respective door panel.

* * * * *